United States Patent [19]

Kirkland

[11] 4,070,283
[45] Jan. 24, 1978

[54] CONTROLLED SURFACE POROSITY PARTICLES AND A METHOD FOR THEIR PRODUCTION

[75] Inventor: Joseph Jack Kirkland, Wilmington, Del.

[73] Assignee: E. I. Du Pont de Nemours and Company, Wilmington, Del.

[21] Appl. No.: 748,770

[22] Filed: Dec. 8, 1976

[51] Int. Cl.² .......................... B01D 15/08; B01J 13/00
[52] U.S. Cl. .............................. 210/31 C; 106/288 B; 106/308 B; 106/309; 210/198 C; 252/448; 252/477 R; 252/313 S; 427/201
[58] Field of Search ............. 210/31 C, 198 C; 55/67, 55/386; 427/201, 202, 204, 214, 215, 226, 228; 252/448, 449, 477 R, 313 S, 317; 106/288 B, 308 B, 309, 287 S, 286

[56] References Cited

U.S. PATENT DOCUMENTS

| | | | |
|---|---|---|---|
| 3,505,785 | 4/1970 | Kirkland | 55/67 |
| 3,782,075 | 1/1974 | Kirkland | 210/198 C |
| 4,010,242 | 3/1977 | Iler et al. | 106/288 B |

Primary Examiner—John Adee

[57] ABSTRACT

Superficially porous macroparticles of improved characteristics are formed from an impervious core having a diameter in the range of about 5 to about 500 microns, at least two monolayers of like microparticles adhered to the core, each microparticle having an average diameter in the range of about 0.005 to about 1.0 micron, and at least two monolayers of like ultramicroparticles adhered to the surface of the microparticles, each ultramicroparticle having a diameter in the range of about 1.0 to about 15 millimicrons.

13 Claims, 6 Drawing Figures

CONTROLLED SURFACE POROSITY PARTICLES AND A METHOD FOR THEIR PRODUCTION

BACKGROUND OF THE INVENTION

1. Field of the Invention

This invention relates to superficially porous macroparticles composed of an impervious core coated with a number of layers of like microparticles and to a process for their manufacture. Such macroparticles are useful as column packings for chromatography, particularly liquid chromatography, as catalysts and as catalyst bases.

2. Discussion of the Prior Art

U. S. Pat. 3,505,785 discloses superficially porous macrospheroids having an average diameter in the range of 5 to 500 microns which are composed of an impervious core coated with a multiplicity of monolayers of colloidal inorganic particles having an average size in the range of 0.005 to 1.0 micron. To obtain a relatively large pore size (characteristically 1,000 A) with these particles, however, one must accept particles with surface areas that are relatively small (characteristically less than 1.0 m$^2$/g). The particles are extremely useful as supports for liquid-liquid (partition) chromatography but suffer, because of their small surface area, for use in liquid-solid (adsorption) chromatography.

SUMMARY OF THE INVENTION

According to this invention, there is provided, as an article of manufacture, a powder of superficially porous macroparticles comprising:

a. an impervious core having an average diameter in the range of about 5 to about 500 microns;

b. at least two monolayers of like microparticles adhered to the core, each microparticle having an average diameter in the range of about 0.005 to about 1.0 micron; and c. at least two monolayers of like ultramicroparticles adhered to the surface of the microparticles, each of the ultramicroparticles having an average diameter in the range of about 1.0 to about 15 millimicrons, the diameter of the ultramicroparticles being no more than one quarter the average diameter of the pores between the microparticles, and the combined microparticle and ultramicroparticle layers constituting from about 0.002 to about 25% of the total volume of the macroparticle.

In the preferred embodiment, the impervious core comprises a glass bead with an average diameter in the range of about 5 to about 100 microns, the microparticles have an average diameter in the range of about 5 to about 500 millimicrons, and the ultramicroparticles have an average diameter in the range of about 1.0 to about 8 millimicrons, both the microparticles and the ultramicroparticles consisting essentially of silica and the diameter of the ultramicroparticles are no more than one quarter the average pore diameter.

To produce these superficially porous macroparticles, there is provided a process comprising the steps of:

a. providing a powder of macroparticles comprising an impervious core having an average diameter in the range of about 5 to about 500 microns and at least two monolayers of like microparticles adhered to the core, each microparticle having an average diameter in the range of about 0.005 to about 1 micron; and b. coating each microparticle with at least two layers of ultramicroparticles having an average diameter in the range of about 1.0 to about 15 millimicrons, the diameter of the ultramicroparticles being no more than 1/4 the average diameter of the pores between the microparticles adhered to the core.

A preferred way to accomplish this is by a. contacting the powder with a sol of the ultramicroparticles, the number of ultramicroparticles in the sol being at least sufficient to cover the surface of the microparticles adhered to the core, whereby each microparticle is coated with a single layer of ultramicroparticles;

b. rinsing off any excess sol;

c. contacting the ultramicroparticle layer with a layer of organic material;

d. repeating steps (b) and (c) at least once so that each microparticle is coated with at least two monolayers of like ultramicroparticles; and e. removing the organic material.

BRIEF DESCRIPTION OF THE DRAWINGS

The present invention can best be described by reference to the following figures in which.

DISCUSSION OF THE PREFERRED EMBODIMENT

Figure 1:
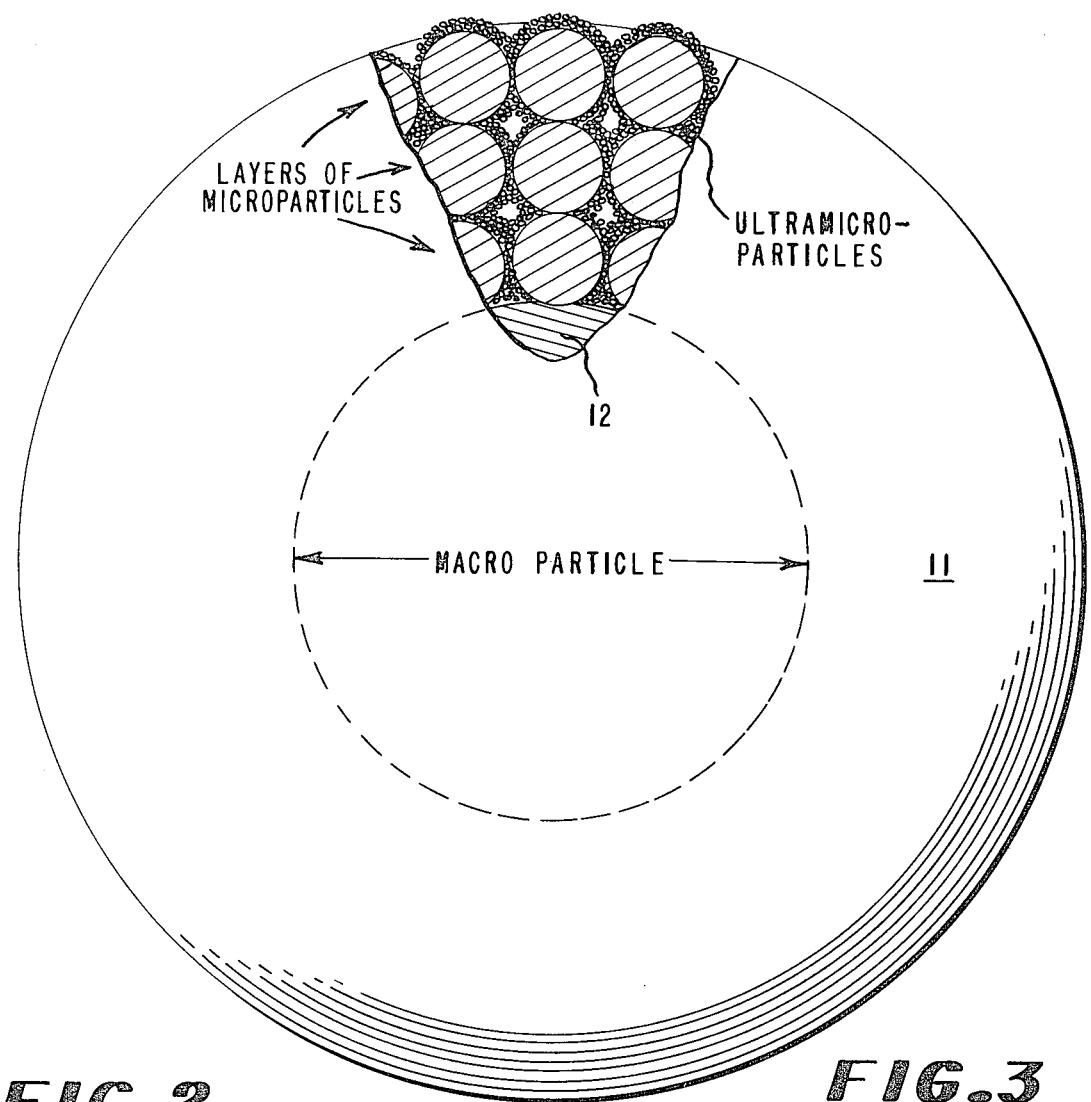
FIG. 1 is a diagrammatical representation of a partially cut-away cross-section of one embodiment of the superficially porous macroparticles of the present invention.
Figure 2:
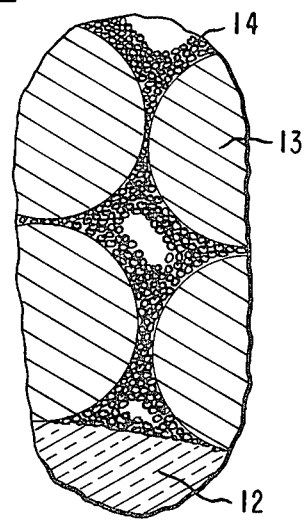
FIG. 2 is an exploded view of a portion of the superficially porous macroparticle of FIG. 1.

The present invention relates to a powder of discrete superficially porous macroparticles such as that shown diagrammatically and in partial cut-away cross-section in FIGS. 1 and 2. The superficially porous macroparticles comprise a core 12 which functions as a substrate for the remaining portion of the macroparticle. Adhered to the surface of the core are at least two monolayers of like microparticles 13. Adhered to the surface of each microparticle 13 are at least two monolayers of like ultramicroparticles 14. Dispersed between the ultramicroparticle coated microparticle are pores 15. Between the ultramicroparticles, and barely discernable in the Figures, are smaller pores 23.

The superficially porous particles of the present invention differ from those of the prior art by the coating of ultramicroparticles on each of the microparticles and on the exposed surface of the core. The presence of these ultramicroparticles has two effects. First of all, the surface area of the superficially porous macroparticle is increased several-fold. Secondly, the superficially porous macroparticles of the present invention have a bimodal pore size distribution; large pores between the ultramicroparticle coated microparticle, and small pores between each ultramicroparticle. This bimodal pore distribution has advantages in certain types of chromatographic separation.

Any impervious material suitable for the intended use (e.g., chromatography) may be used as the core of the macroparticle. By impervious material is meant a material having a surface sufficiently free from pores that when employed as the substrate in a chromatographic process, the materials passing through the resolving zone will not pass into the body or interior of the core. As a rule of thumb, the maximum diameter of the pores on the surface of the core should not be greater than about 5% of the diameter of the microparticle used as the coating. For most purposes, however, the core should be impervious to nitrogen gas. The shape of the core is not critical, although regularly shaped macroparticles, in particular spheres, are preferred because of their uniform packing characteristics. The size of the core and the size of the total macroparticle can be considered to be the same since the coating of microparticle is very thin. The core has an average diameter in the range of about 5 to about 500 microns, preferably about 5 to about 100 microns.

The composition of the core is also not critical except that it should be suitable to the conditions necessary to prepare the coating and suitable for the intended use. The cores can, for example, be made from glass, sand, ceramic, metal, or oxide. In addition to truly impervious materials such as these, other materials such as aluminosilicate molecular sieve crystals can be used. In general, materials which have some structural rigidity are preferred. Glass beads are especially preferred materials for the core because of their uniformity and surface characteristics and the predictability of their packing characteristics.

Figure 3:
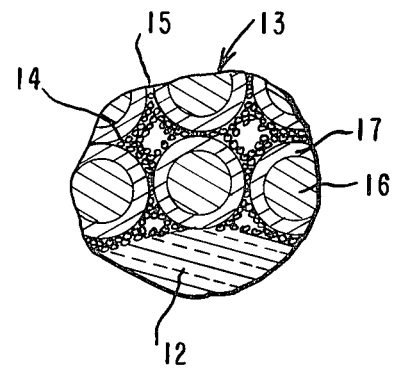
FIG. 3 is a diagrammatical representation of a cross-section of a portion of another embodiment of a superficially porous macroparticle of the present invention.

The microparticles used in the present invention have an average diameter in the range of about 0.005 to about 1.0 micron, preferably 5 to 500 millimicrons. Each monolayer comprises like particles, but adjacent monolayers may be composed of different types of particles. For example, one layer may be silica microparticles and the next layer alumina microparticles. For chromatographic purposes, however, it is preferable to use silica microparticles throughout. The microparticles can be solid as shown in FIG. 1, or, as shown in FIG. 3, they can be composed of a core 16 of one type of material covered with a coating 17 of another type of material. Like microparticles means microparticles which are alike in electrical charge and preferably, but not necessarily, in chemical composition. For example, the microparticles may be a mixture of colloidal particles of silica and colloidal particles of titanium dioxide coated previously with a thin layer of silica.

The microparticles may be any desired substance suitable for the intended use which can be reduced to a colloidal subdivision in which the microparticles have surfaces bearing ionic charges. They must be dispersible in a medium as a colloidal dispersion. Water is the best medium for dispersion of particles bearing ionic charges. Examples of aqueous sols are amorphous silica, iron oxide, alumina, thoria, titania, zirconia, and aluminosilicates including colloidal clays. Silica is the preferred material because of its low order of chemical activity, its ready dispersibility, and the easy availability of aqueous sols of various concentrations.

The ultramicroparticles of the present invention have an average diameter in the range of about 1.0 to 15 millimicrons, preferably 1.0 to 8 millimicrons. As with the microparticles, the layers of ultramicroparticles are of like ultramicroparticles, but adjacent monolayers need not be of like ultramicroparticles. Furthermore, the ultramicroparticles need not be made from the same materials as the microparticles. Generally, they are made from any material suitable for the intended use. Not all materials are available in such small sizes, however, and, for this reason, the ultramicroparticles are preferably silica. Silica sols of the required size are generally available commercially, e.g., Ludox* colloidal silica.

To produce superficially the porous macroparticles of the present invention, a powder of macroparticles is first provided. Each of these macroparticles comprises an impervious core with at least two monolayers of microparticles adhered to the core. The microparticles are then coated with at least two layers of the ultramicroparticles. One way to accomplish this is to

*Registered trademark of E. I. du Pont de Nemours & Co. contact the surface of the microparticles with a sol of ultramicroparticles having an average diameter in the range of about 1.0 to about 15 millimicrons. The diameter of the ultramicroparticles in the sol should be no more than one quarter of the average diameter of the pores between the microparticles adhering to the core of the macroparticle, and the number of ultramicroparticles in the sol should be at least sufficient to cover the surface of each microparticle. After the macroparticle has been contacted with a sol, excess sol is rinsed off and the ultramicroparticles are coated with a layer of organic material. The coated macroparticle is then contacted again with the sol and the organic material so that the desired number of monolayers of like ultramicroparticles is adhered to each microparticle. Finally, the organic material is burned out. Alternatively, two different types of ultramicroparticles (silica and alumina, for example) can be used and the organic material is not needed.

Any suitable organic material can be used in the interlayer, provided it is properly charged. A positively charged material is used when the ultramicroparticles are silica. One suitable positively charged material is the alkyl phosphate mixture sold as an antistatic agent under the trademark Zelec ®.

Macroparticles comprising a core and at least two monolayers of like microparticles can be obtained from a number of sources. Zipax* chromatographic supports are

*Registered trademark of E. I. du Pont de Nemours & Co. suitable starting materials along with a number of other materials. Methods of producing such macroparticles are described in U.S. Pat. No. 3,485,658 and in U.S. Pat. No. 3,505,785, the disclosures in which are hereby incorporated by reference to the present specification. In these patents, the macroparticles are produced as follows. The surface of a substrate is first contacted with a first dispersion of like microparticles which are irreversibly adsorbable onto the surface of the substrate. The substrate comprises a plurality of inorganic particles having an average diameter in the range of about 5 to about 500 microns. The first dispersion is a dispersion of inorganic microparticles having an average diameter in the range of about 0.005 to about 1 micron which contains sufficient microparticles to at least cover the total surface area of the substrate. Excess first dispersion is rinsed off so the surface of the substrate is coated with a single layer of like inorganic microparticles. Next, the coated substrate is contacted with a second dispersion of organic colloidal particles which are irreversibly adsorbable onto the coated surface of the substrate. The number of particles in the second dispersion is at least sufficient to cover the total surface area of the previously coated substrate. Excess second dispersion is rinsed off and the surface of the previously coated substrate is contacted with a third dispersion of like microparticles which are irreversibly adsorbable onto the surface of the previously coated substrate. The third dispersion is again a dispersion of inorganic microparticles having an average diameter in the range of about 0.5 to about 50 microns which contains sufficient microparticles to at least cover the total surface area of the previously coated substrate. The first and third dispersions can be, but are not necessarily, identical. Finally, excess third dispersion is rinsed off and the organic material is removed.

As one specific example, 210 grams of 60–80 mesh soda-lime silica beads are soaked for about 2 hours in a 0.5% solution of Lakeseal ® laboratory glass cleaner, the beads are washed thoroughly with water. The wet beads are then placed in a tube which may consist of a length of 2 inch o.d. glass pipe fitted at the top and bottom with fine stainless steel screens. Excess water is removed from the beads by placing a vacuum on the bottom of the tube. One hundred twenty-five ml. of a 0.5% colloidal dispersion of poly-(diethylaminoethylmethacrylate) acetate (poly-DEAM) is poured on the beads in the tube, the mixture stirred and allowed to stand for 5 minutes. Excess poly-DEAM is removed by upflow washing of the bed with water. The beads are then dried by forcing air through the bed. Eighty milliliters of a 10% dispersion of 200 millimicron silica sol (pH 3.6) is added to the bed, the mixture stirred and allowed to stand for 15 minutes. Excess silica sol is removed by placing a vacuum on the bottom of the tube. The bed is washed free of excess silica sol by an upflow of water until the wash is clean, and the beads are air dried by placing a vacuum on the bottom of the tube.

The poly-DEAM silica sol treatment is repeated three additional times to build up successive layers of silica particles on the surface of the beads. When the desired thickness has been built up, the coatings are permanentized by heating at a temperature high enough to decompose, volatilize, or oxidize the organic interlayer. Alternatively, the particles may be dried and the organic interlayer removed by chemical means such as by oxidization. In the present examples, the beads are first dried at 150° C. under vacuum for 16 hours and then heated to 725° C. for 1 hour.

The method of converting the macroparticle produced by this manner to the superficially porous macroparticles of the present invention are described in the examples below.

EXAMPLE 1

Forty-five g of colloidal silica containing 45% $SiO_2$ (Ludox® TM colloidal silica) was diluted with distilled water to 200 g total to obtain a solution approximately 10% in $SiO_2$ by weight. This pH 9.3 colloidal silica was stirred with a cation exchange resin (Rexyn® 101 - hydrogen form, sold by Fisher Scientific Co.) to deionize the colloidal silica and produce a final pH — 3.6.

25 grams of the macroparticles prepared by Example 1 of U.S. Pat. No. 3,505,785 was placed in a medium porosity sintered glass funnel and 16 ml of a 0.5% aqueous solution of Zelec® DX antistatic agent, was added. This mixture was allowed to stand for 5 minutes with frequent stirring and the excess solution removed by vacuum filtration. The resulting particles were washed with 50 ml of distilled water, filtered off under vacuum and allowed to air-dry on the filter. To this dry powder was added 16 ml of the deionized pH = 3.6 Ludox® solution from above. This mixture was allowed to stand for 15 minutes with occasionally gentle stirring. Excess Ludox® solution was removed by vacuum filtration and the resulting beads gently washed four times with 50 ml of tap water. The washed particles were filtered off by vacuum and allowed to air-dry.

The Zelec® DX - Ludox® TM treatment was repeated successively three more times and the resulting particles dried for 1 hour at 115° C. in a circulating air oven. This dry powder was then heated in a muffle furnace at 650° C. for 2 hours to add mechanical stability. This step, which is not necessary, can be accomplished at any temperature above 125° C. which is sufficient to sinter but not fuse the ultramicroparticles in the time during which heating occurs. This material will be referred to as CSP adsorbent.

Surface areas of samples taken from various stages of the treatments were obtained by the nitrogen flow technique with results shown in Table I.

TABLE I

| Treatment | Surface Area, $m^2/g$ |
| --- | --- |
| Starting particles | 0.85 |
| First Coating | 1.99 |
| Second Coating | 2.65 |
| Third Coating | 3.05 |
| Fourth Coating | 3.52 |
| Heated at 600° C. | 2.73 |

Figure 4:
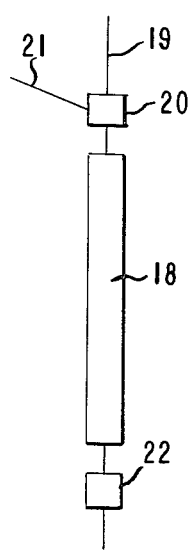
FIG. 4 is a schematic representation of a chromatograph showing the resolving zone containing the superficially porous macroparticle of the present invention.

A liquid chromatographic column was prepared by packing 5.20 g of this material into a 100 cm × 0.21 cm i.d. precision bore stainless steel column according to the techniques described in J. J. Kirkland, ed., "Modern Practice of Liquid Chromatography", Wiley-Interscience, New York, 1971. The column was equilibrated with the carrier liquid and subjected to a series of evaluation tests using a Du Pont 830 liquid chromatograph shown schematically in FIG. 4. The column or resolving zone 18 was packed with the CSP adsorbent. Carrier liquid (solvent) was introduced through line 19 and sample, introduced through line 21, was injected into the carrier stream by injection valve 20. The constituents of the liquid emerging from the column were detected by detector 22. With a carrier of 0.5% isopropanol in isooctane and a flow of 1.0 ml/min, a 1 ml aliquot of benzyl alcohol (1mg/ml) produced the data in Table II. Also compared in this Table is some published data using Vydac® adsorbent (sold by Applied Sciences, Separations Group) and a similar system (2m × 2 mm column, 1% amyl alcohol in isooctane, 3 ml/min, 2800 psi).

TABLE II

| COMPARISON OF CSP VS VYDAC® ADSORBENT | | |
| --- | --- | --- |
| Parameter | CSP | Vydac® |
| Carrier Velocity | 1.14 cm/sec | — |
| Retention Time | 2.49 min | — |
| k' | 0.70 | 1.0 |
| N/meter | 2521 | 915 |
| H | 0.040 cm | 0.11 cm |
| $N_{eff}$ | 430 | — |
| $N_{eff}/t$ | 2.9 | — |

In this Table, $k'$ is the capacity factor, N is the theoretical plate number, $N_{eff}$ is the effective plate number, and H is the plate height. These results suggest that CSP adsorbent is 2-3 times more efficient than Vydac®.

Figure 5:
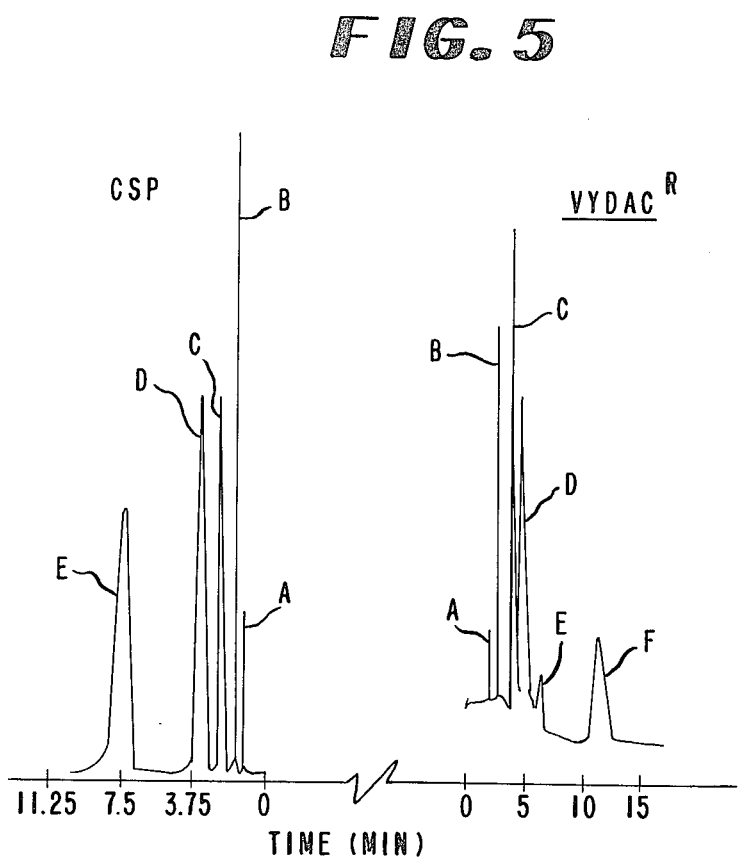
FIG. 5 is a comparison chromatogram showing the respective separations achieved using a powder of the superficially porous macroparticle of the present invention and a powder of prior art particles.

To obtain a further comparison of the performance of the CSP adsorbent with Vydac®, a separation of steroids was carried out. FIG. 5 showed a separation which was obtained on a 7 microliter aliquot of (0.1 mg/ml desoxycorticosterone, 0.22 mg/ml dehydrocorticosterone, 0.22 mg/ml corticosterone, and 0.44 mg/ml hydrocortisone), using a carrier of hexane/chloroform/methanol (70:28:2). The system was operated at a flow of 1.0 ml/min with an input pressure of 500 psi. Also shown in FIG. 5 is a published chromatogram of some steroids produced by a similar separation using Vydac®. The peaks are identified as follows: A — solvent, B — desoxycorticosterone, C — dehydrocorticosterone, D — corticosterone, E — hydrocortisone, and F — cortisol. The CSP adsorbent shows about 25% higher efficiency at about twice the carrier velocity (1.4 vs 0.75 cm/sec) using a solute with a $k'$ value larger than that used with the Vydac® adsorbent (5.2 vs 3.9). These data again indicate that the CSP adsorbent is about twice as efficient as Vydac®. With the same carrier system the $k'$ values for corticosterone are: CSP adsorbent — 2.0; Vydac® adsorbent 1.2. Thus, it appears that the CSP adsorbent is actually about two thirds more retentive than Vydac ® adsorbent even though it has only about one fourth the nitrogen surface area (3.1 vs 12 m²/g). The actual data for the steroids on the CSP adsorbent separation shown in FIG. 5 is given in Table III.

TABLE III

LC OF STERIODS ON CSP ADSORBENT

| Solute | Ret. Time | k' | N | H (cm) |
|---|---|---|---|---|
| Desoxycorticosterone | 1.11 | 0.5 | 564 | 0.177 |
| Dehydrocorticosterone | 3.28 | 3.3 | 553 | 0.181 |
| Corticosterone | 7.27 | 8.4 | 463 | 0.216 |
| Cortisone | 9.20 | 10.9 | 497 | 0.201 |

Figure 6:
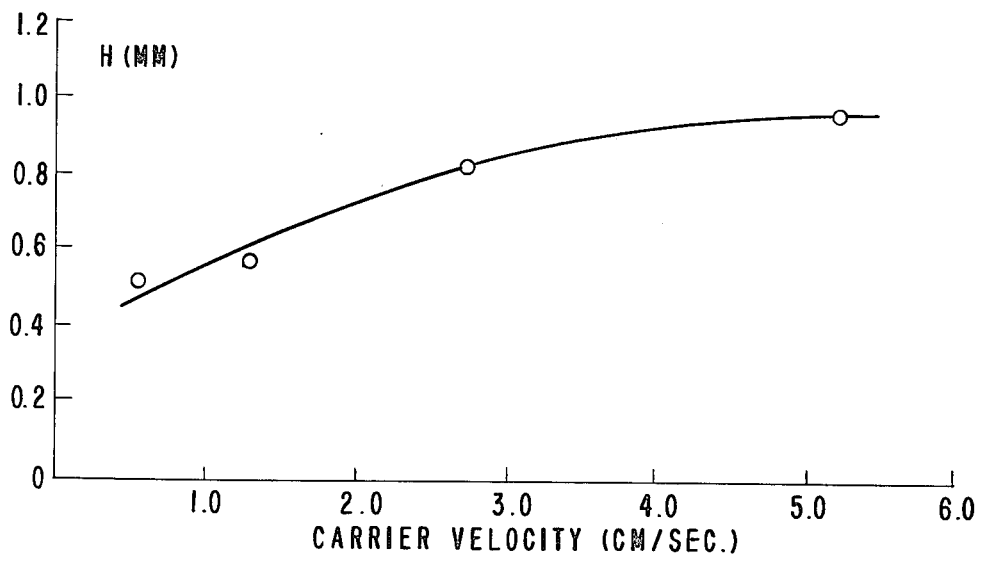
FIG. 6 is a plot of plate height versus carrier velocity for the superficially porous particles of the present invention.

As can be seen from Table III, for the CSP adsorbent, there is a relatively small increase in plate height (H) using solutes with larger k' values, and as can be seen from FIG. 6, the plate height versus carrier velocity curve for the CSP adsorbent displays a gentle slope.

EXAMPLE 2

Seventy-five g of a powder of superficially porous particles comprised of about five layers of 200 millimicron particles adhered to a glass bead support (Zipax ® chromatographic support) was placed in 800 ml of 0.5% Lakeseal ® laboratory cleaner solution and stirred frequently for 30 minutes. The aqueous cleaning solution was removed by washing with 500 ml distilled water 7-8 times by decantation. The product was filtered off on a coarse sintered-glass filter and dried in air.

The cleaned Zipax ® was placed in a 3 inch coarse sintered-glass funnel and 100 ml of 0.5% aqueous Zelec ® DX solution added. The resulting mixture was allowed to stand for 5 minutes with frequent stirring, then washed twice with 350 ml of distilled water, filtered and dried in the funnel. The powder was then treated with 100 ml of 10% Ludox ® AS (10% SiO – 125 g of commercial 30% SiO₂ Ludox ® AS diluted to 400 ml with distilled water) and adjusted to pH 4-6 with nitric acid. The particles in this mixture have a diameter in the range of about 14 millimicrons. This mixture was allowed to stand for 15 minutes in the funnel with occasional gentle stirring. Excess silica sol was then removed by filtration and the resulting cake washed four times by stirring with 400 ml of tap water, followed by filtration. This material was allowed to air-dry in the filter.

The Zelec ® DX - Ludox ® AS treatment described above was carried out successively three more times on the powder and the resulting material heated at 650° C. for 2 hours to add mechanical stability.

The sintered sample was placed in a 10 to 1 excess (by volume) of 0.001M ammonium hydroxide, and the solution allowed to stand for 2 hours with frequent gentle stirring. The particles were then washed twice with 500 ml distilled water by decantation and the solids filtered off on a sintered glass funnel. The powder was allowed to air-dry overnight and then heated at 150° C. for 2 hours in a circulating air oven. To eliminate static charge (which makes the homogeneous packing of this material difficult), the sample was maintained in a closed tank equilibrated with water vapor for 48 hours. The resulting packing was free flowing and easily packed into columns by the dry packing procedure referenced in Example 1.

Surface area measurements were made on this packing material at various steps during preparation, as given in Table IV below.

TABLE IV

| Treatment | Surface Area. m²/g |
|---|---|
| Clean "Zipax" | 0.89, 0.99 |
| First Coating | 2.03, 2.09 |
| Second Coating | 2.35, 2.46 |
| Third Coating | 3.07, 3.01 |
| Fourth Coating | 3.38, 3.50 |
| Heated at 650° C. | 2.67, 2.67 |
| Rehydrated | 2.85, 2.86 |

EXAMPLE 3

One hundred g of −400 mesh soda-lime glass beads previously coated with two layers of 200 mμ silica particles (according to Example 1 of U.S. Pat. No. 3,505,785) was soaked in warm 0.5% Lakeseal ® laboratory detergent cleaning solution for one hour. The solids were washed with tap water until free of the detergent and filtered off on a coarse sintered-glass funnel. The wet cake was then mixed with 200 ml of 0.5% aqueous Zelec ® DX antistatic agent solution and allowed to stand for 10 minutes with occasional gentle stirring. The particles were washed with four 500 ml portions of tap water by sedimentation. The excess water was then filtered off to leave a wet cake.

To the wet cake was added 150 ml of 10% Nyacol ® 215 silica sol (Nyanza Inc., Ashland, Mass.), nominal 5 mμ which had been previously adjusted to pH 6 with dilute hydrochloric acid. The mixture was allowed to stand for 51 minutes with occasional gentle stirring, then washed with four 500 ml portions of tap water by sedimentation. The excess water was filtered off to leave a wet cake.

This Zelec ® DX - Nyacol ® 215 treatment was carried out successively three more times so that the beads had been treated a total of four times with the 5 mμ silica particles. The final material was washed, filtered, air-dried in the funnel overnight, then dried at 150° C. in a circulating air oven for 1 hour. This powder was heated in a muffle furnace at 650° C. for 2 hours.

This product was characterized at various steps in its preparation by dynamic nitrogen surface area measurements as shown in Table V below.

TABLE V

| Treatment | Surface Area, m²/g |
|---|---|
| Starting material | 0.30 |
| Detergent-washed | 0.62, 0.74 |
| First coating | 2.06, 1.88 |
| Second coating | 3.36, 3.11 |
| Third coating | 4.62, 4.22 |
| Fourth coating | 5.56, 4.90 |

EXAMPLE 4

Fifty g of Zipax ® chromatographic support was cleaned with 0.5% Lakeseal ® detergent solution in the manner described in Example 2. The dry material from this treatment was then stirred with 100 ml of 2% aqueous Dispal ® alumina (Continental Oil Company) suspension and allowed to stand for 10 minutes with occasional stirring. The excess alumina was filtered off and the treated particles washed four times with 500 ml of distilled water by decantation. The solids were then filtered off on a coarse sintered-glass funnel to obtain a wet cake.

To this wet cake was added 200 ml of 0.5% Reten ® 205 cationic polymer (Hercules, Inc., Wilmington, Delaware). This mixture was allowed to stand for 10 minutes with occasional gentle stirring. The excess Reten ® 205 solution was then filtered off and the particles washed twice with 500 ml of distilled water by decantation. The treated particles were filtered off on a course sintered-glass funnel and allowed to air-dry.

The resulting particles were subjected successively three more times to the Dispal ® alumina-Reten ® 205 treatments in the manner just described. The final particles were filtered off and allowed to air dry. The solids were then heated in a muffle furnace at 675° C. for 2 hours to remove the organic interlayer from the particles, leaving a porous thin-layer alumina surface. The nitrogen surface area of these beads was approximately 3 m²/g.

The above description is intended to instruct those skilled in the art, and is not intended to limit the scope of the invention. Any modifications, well within the skill of the art, are intended to be included within the scope of this invention and set forth in the appended claims.

What is claimed is:

1. As an article of manufacture, a powder of superficially porous macroparticles comprising:
    a. an impervious core having an average diameter in the range of about 5 to about 500 microns;
    b. at least two monolayers of like microparticles adhered to said core, each microparticle having an average diameter in the range of about 0.005 to about 1 micron; and
    c. at least two monolayers of like ultramicroparticles adhered to the surface of said microparticles, each of said ultramicroparticles having an average diameter in the range of about 1.0 to about 15 millimicrons, the diameter of said ultramicroparticles being no more than one quarter the average diameter of the pores between the microparticles, and the combined microparticle and ultramicroparticle layers constituting from about 0.002 to about 25% of the total volume of the macroparticles.

2. The article of claim 1 wherein all layers of macroparticles contain like microparticles.

3. The article of claim 2 wherein said impervious core has an average diameter in the range of about 5 to about 100 microns, said microparticles have an average diameter in the range of about 5 to about 500 millimicrons, and said ultramicroparticles have an average diameter in the range of about 1.0 to about 8 millimicrons.

4. The article of claim 3 wherein said impervious core comprises a glass bead and said microparticles and ultramicroparticles consist essentially of silica.

5. An apparatus for use in chromatographic separation comprising a resolving zone through which the material to be separated is passed in a carrier phase, said resolving zone comprising the powder of superficially porous macroparticles of claim 2.

6. A process for performing chromatographic separation comprising the steps of contacting the materials to be separated in a carrier phase with the powder of superficially porous macroparticles of claim 2 and determining the extent of retention of at least one of said materials by said macroparticles.

7. A process for producing a powder of superficially porous macroparticles comprising the steps of:
    a. providing a powder of macroparticles each comprising an impervious core having an average diameter in the range of about 5 to about 500 microns and at least two monolayers of microparticles adhered to said core, each microparticle having an average diameter in the range of about 0.005 to about 1 micron; and
    b. coating said microparticles with at least two monolayers of ultramicroparticles, each ultramicroparticle having an average diameter in the range of about 1.0 to about 15 millimicrons, the diameter of said ultramicroparticles being no more than one quarter the average diameter of the pores between the microparticles adhered to said core.

8. The process of claim 7 wherein the step of coating said microparticles comprises the steps of:
    a. contacting the powder so formed with a sol of said ultramicroparticles, the number of ultramicroparticles in said sol being at least sufficient to cover the surface of the microparticles adhered to said core;
    b. rinsing off any excess sol so that each microparticle is coated with a single layer of ultramicroparticles;
    c. contacting the coated microparticles with an organic material to coat the ultramicroparticles with a monolayer of organic material;
    d. repeating steps (b) and (c) at least once so that each microparticle is coated with at least two monolayers of like ultramicroparticles; and
    e. removing the organic material.

9. A process for producing a powder of superficially porous macroparticles comprising the steps of:
    a. effecting contact between the surface of a substrate and a first dispersion of microparticles which are irreversibly adsorbable onto the surface of said substrate, said substrate comprising a plurality of inorganic particles having an average diameter in the range of about 5 to about 500 microns, said first dispersion being a dispersion of inorganic microparticles having an average diameter in the range of about 0.005 to about 1 micron and containing sufficient microparticles to at least cover the total surface area of said substrate;
    b. rinsing off any excess first dispersion so that the surface of said substrate is coated with a single layer of inorganic microparticles;
    c. effecting contact between the coated substrate and a second dispersion of organic colloidal particles which are irreversibly adsorbable onto the coated surface of said substrate, the number of particles in the second dispersion being at least sufficient to cover the coated surface of said substrate;
    d. rinsing off any excess second dispersion so that the previously coated surface of said substrate is further coated with a single layer of colloidal organic particles;
    e. effecting contact between the surface of the previously coated substrate and a third dispersion of microparticles which are irreversibly adsorbable onto the surface of the previously coated substrate, said third dispersion being a dispersion of inorganic microparticles having an average diameter in the range of about 0.5 to about 50 microns and contacting sufficient microparticles to at least cover the total surface area of the previously coated substrate;
    f. rinsing off any excess third dispersion so that the previously coated surface of said substrate is coated with a second single layer of inorganic microparticles;
    g. removing the organic material whereby a powder of macroparticles is formed;
    h. contacting the powder so formed with a sol of ultramicroparticles having an average diameter in the range of about 1.0 to about 15 millimicrons, the diameter of said ultramicroparticles being no more than one quarter of the average diameter of the pores between the microparticles adhered to said substrate, the number of ultramicroparticles in the sol being at least sufficient to cover the surface of the microparticles attached to said substrate, whereby the microparticles are coated with a single layer of ultramicroparticles;

i. rinsing off any excess sol;
j. contacting the ultramicroparticles with a monolayer of organic material;
k. repeating steps (g) and (i) at least once so that the microparticles adhered to said substrate are coated with at least two monolayers of like ultramicroparticles; and
l. removing the organic material.

10. The process of claim 9 wherein said first and third dispersions are like dispersions whereby the particles of said substrate are coated with like inorganic particles.

11. The process of claim 10 wherein steps (a) and (b) are repeated at least once whereby said substrate is coated with at least three layers of like microparticles.

12. The process of claim 10 wherein particles of said substrate having an average diameter in the range of about 5 to about 100 microns, said microparticles in said first and third dispersions have an average diameter in the range of about 5 to about 500 millimicrons, and said ultramicroparticles have an average diameter in the range of about 1.0 to about 8 millimicrons.

13. The process of claim 10 wherein the particles of said substrate comprises a plurality of glass beads and wherein said microparticles and said ultramicroparticles consist essentially of silica.

* * * * *